United States Patent [19]
Zalles

[11] 4,194,950
[45] Mar. 25, 1980

[54] LIQUID PURIFYING APPARATUS

[76] Inventor: Robert I. Zalles, Casilla Correo 966, La Paz, Bolivia

[21] Appl. No.: 849,931

[22] Filed: Nov. 9, 1977

[51] Int. Cl.² .............................................. C02B 1/04
[52] U.S. Cl. ............................... 202/185 R; 202/234; 202/236; 203/10; 203/49; 203/89; 210/72; 210/180
[58] Field of Search ...................... 203/49, 100, 89, 10, 203/11, 42, DIG. 1, 86; 202/236, 234, 185 A, 185 R; 159/1 S, 1 SF; 210/180

[56] References Cited

U.S. PATENT DOCUMENTS

| | | | |
|---|---|---|---|
| 2,405,877 | 8/1946 | Delano | 203/DIG. 1 |
| 2,412,466 | 12/1946 | Miller | 203/DIG. 1 |
| 2,427,262 | 9/1947 | Delano | 203/DIG. 1 |
| 2,445,350 | 7/1948 | Ginnings | 203/DIG. 1 |
| 2,788,316 | 4/1957 | Bjorksten | 203/DIG. 1 |
| 3,168,450 | 2/1965 | Black | 203/49 |
| 3,505,175 | 4/1970 | Zalles | 202/234 |
| 3,687,821 | 8/1972 | Zalles | 202/185 A |
| 3,875,926 | 4/1975 | Frank | 203/DIG. 1 |

*Primary Examiner*—Wilbur L. Bascomb, Jr.
*Attorney, Agent, or Firm*—Lee C. Robinson, Jr.

[57] ABSTRACT

Liquid purifying apparatus in which an infeed chamber, an evaporator chamber and a condenser chamber are arranged in that order along a flow path. A first inflatable bag is interposed across the flow path between the infeed chamber and the evaporator chamber, and a second inflatable bag is interposed across the flow path between the evaporator chamber and the condenser chamber. These bags are respectively located substantially entirely in the evaporator and condenser chambers, and the bags each comprise a flexible layer of highly absorbent fibrous material including a plurality of plies. The liquid to be purified is introduced into the infeed chamber, and it flows into the evaporator chamber to a level such that a portion of the first bag is immersed in the liquid. The liquid spreads by immersion and capillary action over substantially all of the fibers in the first bag to form thin liquid films along the individual fibers. Upon the introduction of air into the infeed chamber and through the first bag to the evaporator chamber, the bag inflates, and the air passes over the individual fibers to vaporize the liquid films. The vapor proceeds through the secong bag into the condenser chamber to inflate the second bag and form the condensate. Previously purified liquid is used to form thin films on the fibers of the second bag to provide an additional evaporation effect and thereby reduce the temperature within the condenser chamber. In some embodiments this cooling action is augmented by directing the residual vapor through a series of perforations in the wall of the condenser chamber in a manner such that a further evaporation effect takes place as the vapor is discharged.

12 Claims, 4 Drawing Figures

LIQUID PURIFYING APPARATUS

BACKGROUND OF THE INVENTION

This invention relates to liquid purifying apparatus, and more particularly to apparatus for rapidly and economically evaporating and then condensing a liquid in a novel and unique manner.

There has been developed a liquid purification system which is economical in operation and highly efficient. One such system employs an evaporator unit of the type disclosed in Robert I. Zalles U.S. Pat. No. 3,505,175 granted Apr. 7, 1970 and a condenser unit of the type disclosed in Robert I. Zalles U.S. Pat. No. 3,687,821 granted Aug. 29, 1972. The evaporator and condenser units utilize layers of fibrous material having a multiplicity of liquid absorbent fibers. The liquid to be purified is spread over the fibers of the evaporator unit to form extremely thin liquid films, illustratively only a few molecules in thickness, which are rapidly evaporated by a stream of air or other gaseous fluid. The resulting vapor is condensed in the condenser unit as a substantially pure liquid.

Heretofore, in liquid purifying apparatus including those of the foregoing type, difficulties were encountered in maintaining the individual fibers of the absorbent material in a sufficiently moist condition to operate the apparatus at maximum capacity. In addition, and this has been of special moment in prior apparatus of the type in which the gaseous fluid passed through the material at right angles to the fluid flow path, problems were encountered in making sure that the rate of flow of the gas over the individual fibers was sufficiently high to process the liquid in large quantities. A still further disadvantage of many prior liquid purification systems was their inability to operate economically and efficiently on a continuous day-in and day-out basis.

SUMMARY

One general object of this invention, therefore, is to provide new and improved apparatus for the purification of liquid.

More specifically, it is an object of the invention to provide such apparatus in which the individual fibers in the evaporator and condenser units are continuously maintained in a fully moist condition during the liquid purification process.

Another object of the invention is to provide liquid purifying apparatus of the character indicated in which the air or other gaseous fluid is directed over the fibers at a rapid and uniform rate.

A further object of the invention is to provide novel apparatus for purifying liquid that is economical and thoroughly reliable in operation.

In an illustrative embodiment of the invention, the apparatus includes an infeed chamber, an evaporator chamber and a condenser chamber which are arranged in that order along a flow path. A first flexible fibrous layer is interposed between the infeed chamber and the evaporator chamber, and a second flexible fibrous layer is interposed between the evaporator chamber and the condenser chamber. Each of these layers comprises a plurality of plies of cotton gauze or other fibrous material which is highly absorbent with respect to the liquid to be purified. The liquid is introduced into the infeed chamber, and it flows into the evaporator chamber to the first flexible fibrous layer and spreads over the fibers in the first layer to form thin liquid films around the individual fibers. Air or other gaseous fluid also is introduced into the infeed chamber and through the first fibrous layer into the evaporator chamber. The air passes over the individual fibers to vaporize the liquid films, and the vapor proceeds through the second fibrous layer into the condenser chamber where it is condensed. A supply of previously purified liquid is deposited on the fibers of the second fibrous layer, and this latter liquid is evaporated as the vapor passes through the layer to reduce the temperature within the condenser chamber.

In accordance with one feature of the invention, in several important embodiments, the level of liquid within the evaporator chamber is such that a portion of the first flexible fibrous layer is immersed in the liquid. The liquid spreads over the individual fibers of the layer to provide thin liquid films around the fibers and thereby maintain the layer in a fully moist condition at all times. With this arrangement, a maximum quantity of liquid is deposited on the layer and is evaporated to form the vapor.

In accordance with another feature of certain advantageous embodiments of the invention, the flexible fibrous layers are in the form of inflatable bags which are respectively disposed in the evaporator chamber and the condenser chamber. As the gaseous fluid passes into the evaporator chamber, it inflates the evaporator bag, and the resulting vapor similarly inflates the condenser bag as it moves into the condenser chamber. The arrangement is such that a large portion of the surface area of the respective bags is exposed to the gaseous and vaporized fluids to provide a substantial increase in the output of the apparatus.

In accordance with still another feature of the invention, in a number of preferred arrangements, the condenser chamber includes a series of closely spaced perforations along only the upper portion of its side wall. After passing through the fibrous layer in the condenser chamber, the vapor no longer is in a fully saturated condition, but it contains sufficient moisture to produce an evaporation effect as it is discharged through the perforations and expands into the atmosphere. This evaporation results in additional cooling which further increases the efficiency of the condensing process.

The present invention, as well as further objects and features thereof, will be understood more clearly and fully from the following description of a preferred embodiment, when read with reference to the accompanying drawings.

DESCRIPTION OF A PREFERRED EMBODIMENT

Figure 1:
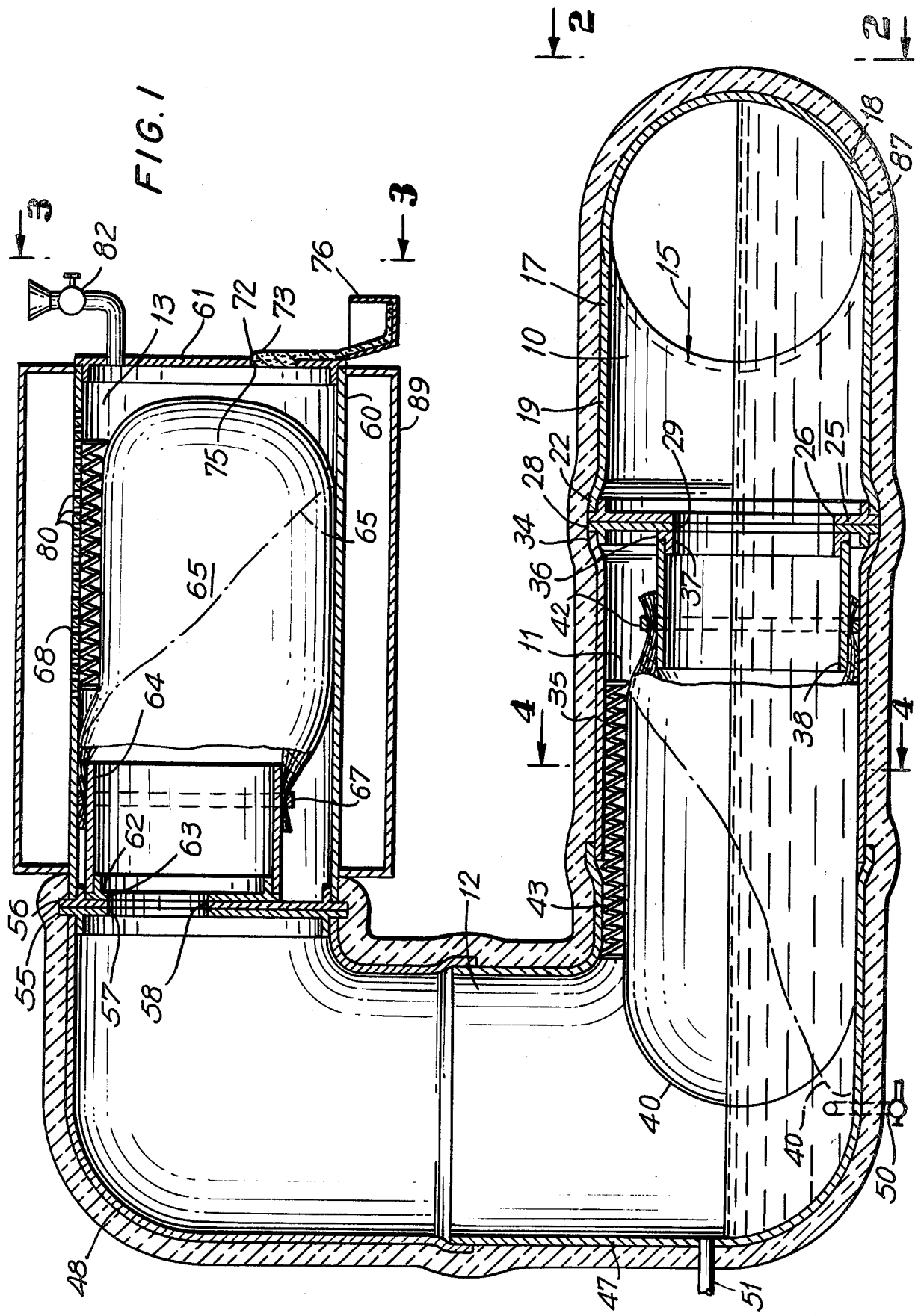
FIG. 1 is a partially diagrammatic vertical sectional view of apparatus for purifying liquid in accordance with an illustrative embodiment of the invention.

Referring to FIG. 1 of the drawings, there is shown an apparatus for purifying liquids which is illustrative of a preferred embodiment of the invention. The apparatus includes a liquid infeed chamber 10, an evaporator chamber 11, a connecting chamber 12 and a condenser chamber 13 arranged in that order along a flow path indicated schematically by the arrow 15. In a manner that will become more fully apparent hereinafter, brackish water or other impure liquid is introduced into the infeed chamber 10, and it is recovered in the form of substantially pure liquid from the condenser chamber 13.

The infeed chamber 10 is defined by an elbow 17. The elbow 17 is of circular cross-section and includes a right angle portion 18 and a discharge section 19. The outfeed end of the discharge section 19 is flared as at 22 to accommodate an annular end cap 25. This cap is provided with a circular opening 26 which is located off-center adjacent the lower portion of the cap.

The annular end cap 25 is in mating relationship with a second annular end cap 28. This latter end cap similarly includes a circular opening 29 which is disposed off-center adjacent the lower portion of the cap such that it is coincident with the opening 26 in the cap 25. The caps 25 and 28 are rigidly affixed in facing relationship with each other.

The end cap 28 is secured within the flared end 34 of an evaporator conduit 35 which forms the evaporator chamber 11. An annular cap 26 is located adjacent the right end of the evaporator conduit 35, as viewed in FIG. 1, and is affixed to the downstream surface of the end cap 28. The cap 36 is smaller in diameter than the cap 28 and is provided with a central opening 37 which is coincident with and has the same diameter as that of the opening 29. The cap 36 supports a sleeve 38 which is maintained in spaced relationship with the inner surface of the evaporator conduit 35.

An evaporator bag 40 is interposed across the flow path 15 between the infeed chamber 10 and the evaporator chamber 11. The bag 40 faces in the downstream direction with respect to the flow path 15 and is disposed substantially entirely within the evaporator chamber 11. The open upstream end of the evaporator bag is positioned around the annular sleeve 38 where it is held in place by a suitable clamp 42. A plurality of spacers, illustratively in the form of coil springs 43, extend in a lengthwise direction along the upper portion of the bag to maintain the bag in spaced relationship with the inner surface of the evaporator conduit 35.

The evaporator bag 40 is sufficiently flexible to enable it to inflate upon the introduction of gaseous fluid into the infeed chamber 10. In FIG. 1 the inflated position of the evaporator bag is shown by full lines and the deflated position by broken lines. The bag is fabricated from a plurality of plies of a fibrous material such as cotton gauze, for example, to provide a multiplicity of fibers which are highly absorbent with respect to the liquid fluid to be purified. Although the thickness of the bag may vary over a wide range, depending upon such factors as the type of liquid being purified, the desired output rate, the dimensions of the various components of the apparatus, etc., in several advantageous embodiments the thickness should be substantial and preferably should be at least about 2.0 centimeters for best results. The bag need not be of woven construction but instead may comprise individual fibers formed in a nonwoven bat. In the deflated position of the bag, it rests substantially entirely along the lower surface of the evaporator conduit 35 at the bottom of the evaporator chamber 11.

The evaporator conduit 35 is in open communication with a pair of elbows 47 and 48. These elbows define the connecting chamber 12 and are disposed along the flow path 15 on the downstream side of the evaporator. The elbow 47 includes a drain 50 which is located at the lowermost portion of the apparatus immediately adjacent the closed or downstream end of the evaporator bag 40. A second drain 51 in the elbow 47 is positioned immediately above the desired level for the liquid within the evaporator chamber 11. This latter drain serves as a safety drain to prevent the accumulation of excess liquid within the chamber.

The downstream end of the elbow 48 is provided with an annular end cap 55 in facing relationship with a second annular end cap 56. The end caps 55 and 56 are of a configuration similar to that of the end caps 25 and 28 between the chambers 11 and 12. The caps 55 and 56 include respective openings 57 and 58 which are of a diameter smaller than that of the openings in the caps 25 and 28, however, and are located off-center adjacent the upper portions of the caps. The openings 57 and 58 are in coincident relationship with each other to maintain the connecting chamber 12 in open communication with the condenser chamber 13.

The condenser chamber 13 is formed by a cylindrical condenser conduit 60. The upstream end of the conduit 60 is rigidly affixed to the end cap 56, while the downstream end is closed by an end cap 61. An annular cap 62 is secured in facing relationship with the end cap 56. The cap 62 is of a diameter smaller than that of the cap 56 and includes an off-center opening 63 which is coincident with the cap openings 57 and 58. A sleeve 64 extends from the cap 62 into the condenser chamber 13 and is supported by the cap in a manner similar to that of the sleeve 38 in the evaporator chamber 11.

A condenser bag 65 is disposed substantially entirely within the condenser chamber 13 with its open end secured to the sleeve 64 by a clamp 67. The condenser bag 65 is interposed across the flow path 15 between the connecting chamber 12 and the condenser chamber 13 with the bag located substantially entirely in the condenser chamber. The bag is fabricated from a flexible layer of fibrous material and is arranged to inflate in response to the introduction of fluid into the condenser chamber. The construction of the condenser bag may be the same as that of the evaporator bag 40, and the condenser bag similarly includes a plurality of plies to provide a multiplicity of fibers of a material which is highly absorbent with respect to the liquid to be purified. Coil spring spacers 68 serve to maintain the upper portion of the condenser bag in spaced relationship with the adjacent inner surface of the condenser conduit 60.

The end cap 61 on the condenser conduit 60 is provided with an outfeed opening 72. The lower edge of the opening 72 forms a weir 73 for the discharge of the purified liquid and is located at the same level as the lowermost portions of the end cap openings 55 and 56. A layer 75 of fibrous material is interposed in the opening 72 to prevent the discharge of substantial quantities of gaseous fluid through the opening but to permit the escape of purified liquid by capillary action. The purified liquid is deposited in an outfeed trough 76 which is suitably mounted on the exterior surface of the cap 61.

In the illustrated embodiment the gaseous fluid is discharged from the condenser chamber 13 through a multiplicity of closely spaced perforations 80. The perforations 80 are located in only the upper portion of the condenser conduit 60, and for best results they encompass an angular surface area which should not exceed ninety degrees. A priming cock 82 is positioned on the end cap 61 adjacent the perforations 80 to permit the introduction of previously purified liquid into the condenser chamber 13, for purposes that will become more fully apparent hereinafter.

For optimum results the temperature of the fluid being processed should be carefully controlled. To accomplish this the portion 18 of the infeed elbow 17 is provided with a heating unit 85 (FIG. 2) which maintains the incoming liquid and gaseous fluids at an elevated temperature. This temperature advantageously lies within the range of from about 70° C. to about 80° C. Although temperatures above about 80° C. also may be employed, the boiling point of the particular liquid being used should not be exceeded, and for reasons of economy the temperature of the incoming fluid should be sufficient only to provide a moderate temperature differential with respect to ambient temperature. In the illustrated embodiment both the liquid and gaseous fluids are maintained at this elevated temperature, although in other embodiments only one of the incoming fluids, preferably the liquid fluid, is heated to the indicated temperature. To minimize heat loss as the fluids move along the flow path 15, the infeed chamber 10, the evaporator chamber 11 and the connecting chamber 12 are provided with a layer 87 of insulating material.

Figure 3:
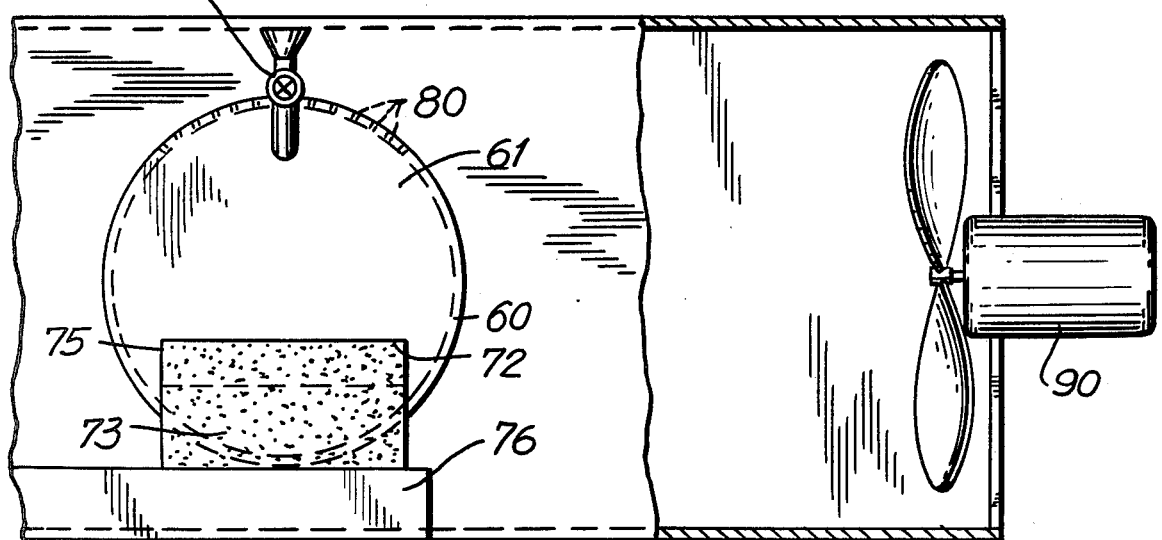
FIG. 3 is a side view of another portion of the apparatus as seen from the line 3—3 in FIG. 1.
Figure 4:
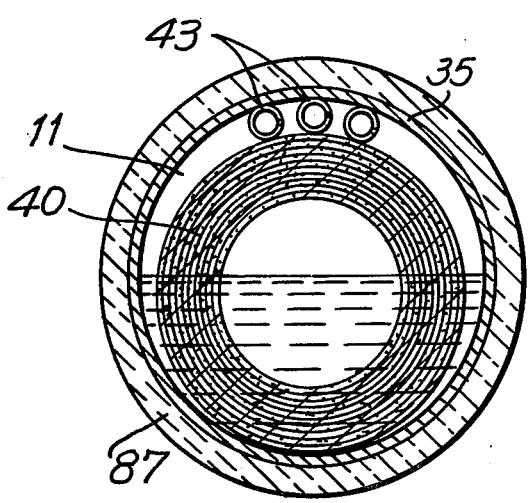
FIG. 4 is a transverse sectional view taken along the line 4—4 in FIG. 1.

To exercise a further degree of control over the temperature of the fluids being processed, in certain embodiments it is desirable to cool the condenser chamber 13. The cooling of the condenser chamber is accomplished through the use of a cooling duct 89 (FIG. 3) and a fan 90 which directs a flow of ambient air past the condenser chamber. The cooling of the condenser chamber assists in maintaining a temperature differential between the fluid in the evaporator chamber and that in the condenser chamber.

Prior to initiating the liquid purification process, the condenser chamber 13 is primed with previously purified water or other liquid introduced through the priming cock 82. The condenser chamber is filled with the previously purified liquid to a level immediately below the lower portion of the opening 63 in the annular cap 62. The condenser bag 65, which at this point is in its deflated broken-line position and rests along the lower portion of the condenser chamber, is submerged within the liquid to thoroughly wet the bag. The liquid spreads by immersion and capillary action over the fibers in the bag to form thin liquid films around the individual fibers.

To initiate the liquid purification process, the liquid to be purified is introduced into the right-angle portion 18 of the infeed conduit 17. The liquid is heated by the heating unit 85 to a temperature within the range described above, and it proceeds through the infeed chamber 10 and into the evaporator chamber 11. Sufficient liquid is introduced into the evaporator chamber 11 to maintain the liquid level immediately beneath the chamber's axial centerline. Should the liquid increase above this level, the excess liquid is discharged through the drain 51.

The evaporator bag 40 is interposed across the flow path 15 between the infeed chamber 10 and the evaporator chamber 11 and is disposed substantially entirely in this latter chamber. The liquid flowing into the evaporator chamber 11 submerges a substantial portion of the layer of fibrous material forming the bag 40, and the liquid spreads over substantially all of the fibers in the layer by immersion and capillary action to thoroughly wet the bag. The liquid forms extremely thin liquid films on the individual fibers. Each of these films preferably is only a few molecules in thickness and should not exceed a thickness of about 1 mm. The arrangement is such that a large majority of the liquid molecules comprise surface or boundary layer molecules on the fibers.

Figure 2:
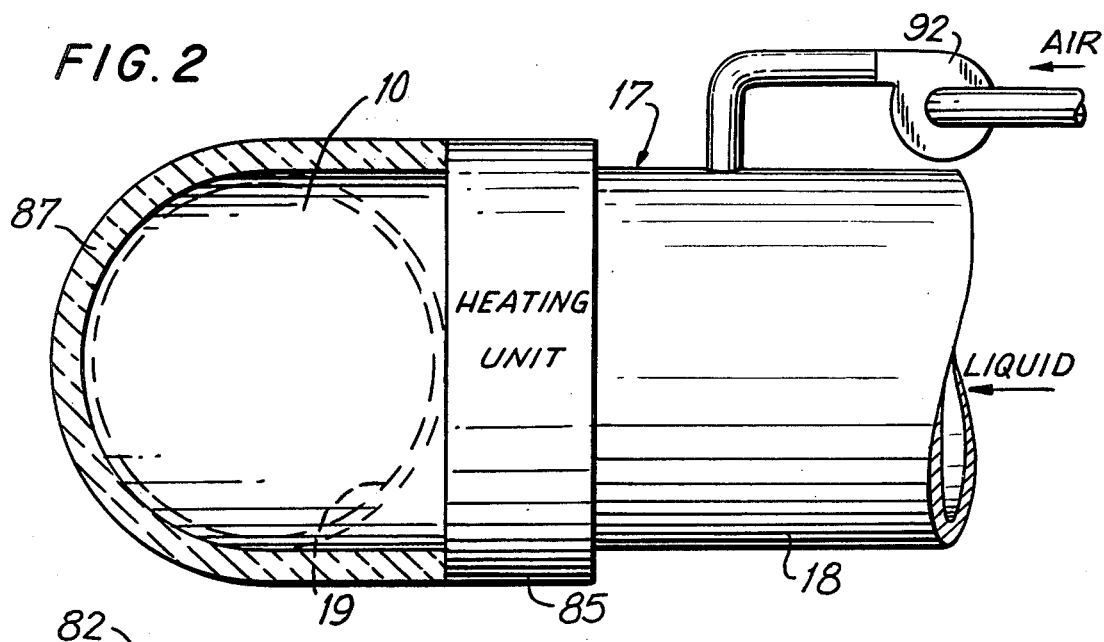
FIG. 2 is a side view of a portion of the apparatus as seen from the line 2—2 in FIG. 1.

As best shown in FIG. 2, a blower 92 serves to direct a large volume of air or other gaseous fluid into the infeed conduit 17 and through the heater 85. The air is heated by the heater 85 to a temperature commensurate with that of the incoming liquid, and the heated air enters the evaporator chamber 11 and inflates the evaporator bag 40. Upon the inflation of the evaporator bag, the coil springs 43 prevent the upper part of the bag from pressing against the adjacent interior wall of the evaporator chamber and thus blocking off a portion of the bag's evaporation area.

The incoming gaseous fluid moves along the flow path 15 and through the fibrous layer comprising the evaporator bag 40. As the gaseous fluid proceeds through the evaporator bag, it passes over the multiplicity of fibers forming the bag and comes in contact with the thin liquid films on the fibers. The individual liquid molecules in these films are subjected to almost immediate evaporation and absorption by the gaseous fluid. The resulting liquid vapor is transmitted to the connecting chamber 12, while any impurities in the liquid are retained on the fibers. The rate of flow of the incoming liquid is adjusted so that it is equal to the rate of evaporation, while the gaseous fluid is introduced at a rate which advantageously is substantially in excess of the liquid.

Evaporation by absorption is essentially a cooling phenomena. The temperature of the gaseous fluid as it leaves the evaporator chamber 11 is sufficiently lowered by the evaporation process so that the vapor is in a fully saturated condition. The saturated vapor proceeds along the flow path 15 through the connecting chamber 12 and into the condenser chamber 13. The vapor entering the condenser chamber 13 inflates the condenser bag 65 and passes over the thin liquid films of previously purified liquid on the individual fibers of the condenser bag. As the condenser bag inflates, its upper portion is maintained in spaced relationship with the adjacent inner wall of the condenser chamber by the coil spring spacers 68.

As has been explained, prior to initiating the purification operation the fibers forming the condenser bag 65 are wetted with previously purified condensate. The resulting liquid films on the individual fibers of the condenser bag are extremely thin and are similar in character to the films on the fibers of the evaporator bag 40. The surrounding ambient atmosphere in the condenser chamber 65 tends to evaporate these thin films on the condenser bag and thereby cool the fibers to a temperature below that of the incoming vapor. As the vapor hits the cooled fibers, a substantial portion of the vapor is condensed and accumulates as purified liquid in the lower portion of the condenser chamber 13. The purified liquid flows continuously through the fibrous layer 75 in the outfeed opening 72 to the trough 76.

At the time the vapor exits from the fibrous material forming the condenser bag 65, its temperature increases slightly to cause the vapor to be in an unsaturated condition. The vapor proceeds through the perforations 80 in the upper portion of the condenser conduit 60 and is discharged under pressure to the atmosphere. The expansion of the vapor as it reaches the atmosphere produces an additional cooling phenomenon which lowers the temperature of the condenser conduit and provides a further improvement in the condensing operation.

In a number of preferred embodiments of the invention, a series of liquid purifying devices, each similar to that described above and illustrated in the drawings, are arranged in parallel relationship with each other to purify the liquid in large quantities on a continuing basis. The condenser chamber of each of these devices advantageously is oriented above the evaporator chamber in the manner shown in FIG. 1 so that any excess liquid in the condenser chamber will drain by gravity into the evaporator chamber. Should the level of liquid within the evaporator chamber exceed that of the drain 51, the liquid flows through the drain and is discharged. In cases in which the liquid within the evaporator chamber becomes over-saturated with salt or other impurities due to continuous operation of the apparatus over an extended period of time, the over-saturated liquid is drawn off through the drain 50. The liquid in the resulting by-product may be removed through another evaporator having similar characteristics to the one disclosed.

Although the use of highly absorbent fibers in the evaporator and condenser bags has been described as having particular utility in connection with the invention, in its broadest aspects the invention is not limited to the use of such fibers. For example, one or more flexible layers of open-cell foam or other cellular material may be employed in place of the fibrous layers described heretofore. The individual cells of the material should be interconnected to permit the free passage of gaseous fluid and to enable the liquid to spread by immersion and capillary action through substantially all of the cells. The size and orientation of the cells should be sufficient to enable the formation of thin liquid films over a large surface area.

The terms and expressions that have been employed are used as terms of description and not of limitation, and there is no intention, in the use of such terms and expressions, of excluding any equivalents of the features shown and described or portions thereof, it being recognized that various modifications are possible within the scope of the invention claimed.

What is claimed is:

1. Liquid purifying apparatus comprising, in combination;
   means defining an infeed chamber, an evaporator chamber and a condenser chamber arranged in that order along a flow path;
   first bag means interposed across the flow path between the infeed chamber and the evaporator chamber, the first bag means being disposed substantially entirely in the evaporator chamber;
   second bag means interposed across the flow path between the evaporator chamber and the condenser chamber, the second bag means being disposed substantially entirely in the condenser chamber;
   each of the bag means comprising a flexible fibrous layer of a material which is highly absorbent with respect to the liquid to be purified;
   means for introducing the liquid to be purified into said infeed chamber, the liquid flowing into the evaporator chamber to the interior of the first bag means and spreading over substantially all of the fibers in the first bag means to form thin liquid films around the individual fibers;
   means for introducing gaseous fluid into the infeed chamber and through the first bag means into the evaporator chamber, the gaseous fluid passing over said individual fibers to vaporize the liquid films thereon;
   the vapor in the evaporator chamber flowing through the second bag means into the condenser chamber and being condensed therein; and
   means for recovering the condensate from the condenser chamber.

2. Apparatus as defined in claim 1, which further comprises:
   means for maintaining the first bag means and the second bag means is spaced relationship with the interior walls of the evaporator chamber and the condenser chamber, respectively.

3. Liquid purifying apparatus comprising, in combination:
   means defining an infeed chamber, an evaporator chamber and a condenser chamber arranged in that order along a flow path;
   first bag means introposed across the flow path between the infeed chamber and the evaporator chamber, the first bag means including a first inflatable bag disposed substantially entirely in the evaporator chamber;
   second bag means interposed across the flow path between the evaporator chamber and the condenser chamber, the second bag means including a second inflatable bag disposed substantially entirely in the condenser chamber;
   each of the bag means comprising a flexible layer having a multiplicity of fibers of a material which is highly absorbent with respect to the liquid to be purified;
   means for introducing the liquid to be purified into said infeed chamber, the liquid flowing into the evaporator chamber to the interior of the first bag and spreading over substantially all of the fibers in the first bag to form thin liquid films around the individual fibers;
   means for introducing gaseous fluid into the infeed chamber and through the first bag into the evaporator chamber, the gaseous fluid inflating the first bag and passing over said individual fibers to vaporize the liquid films thereon;
   the vapor in the evaporator chamber flowing through the second bag into the condenser chamber, the vapor inflating the second bag and passing over the fibers therein and being condensed in the condenser chamber; and
   means for recovering the condensate from the condenser chamber.

4. Liquid purifying apparatus comprising, in combination:
   means defining an infeed chamber, an evaporator chamber and a condenser chamber arranged in that order along a flow path, the condenser chamber having outl t means for discharging purified liquid and a multiplicity of closely spaced perforations separate from the outlet means;
   first bag means interposed across the flow path between the infeed chamber and the evaporator chamber, the first bag means being disposed substantially entirely in the evaporator chamber;
   second bag means interposed across the flow path between the evaporator chamber and the condenser chamber, the second bag means being disposed substantially entirely in the condenser chamber;

each of the bag means comprising a flexible layer having a multiplicity of fibers of a material which is highly absorbent with respect to the liquid to be purified;

means for introducing the liquid to be purified into said infeed chamber, the liquid flowing into the evaporator chamber to the interior of the first bag means and spreading over substantially all of the fibers in the first bag means to form thin liquid films around the individual fibers;

means for introducing gaseous fluid into the infeed chamber and through the first bag means into the evaporator chamber, the gaseous fluid passing over said individual fibers to vaporize the liquid films thereon;

the vapor in the evaporator chamber flowing through the second bag means into the condenser chamber, a substantial portion of the vapor being condensed in the condenser chamber and the remaining portion being discharged through said perforations; and means for recovering the condensate from the outlet means of the condenser chamber.

5. Apparatus as defined in claim 4, in which each of the bag means comprises a plurality of plies of said highly absorbent material.

6. Liquid purifying apparatus comprising, in combination:

means defining an infeed chamber, an evaporator chamber, a connecting chamber and a condenser chamber arranged in that order along a flow path;

first inflatable bag means interposed across the flow path between the infeed chamber and the evaporator chamber;

second inflatable bag means interposed across the flow path between the connecting chamber and the condenser chamber;

each of the bag means comprising a flexible layer having a multiplicity of fibers of a material which is highly absorbent with respect to the liquid to be purified;

means for introducing the liquid to be purified into said infeed chamber, the liquid flowing into the evaporator chamber to the interior of the first bag means and spreading over substantially all of the fibers in the first bag means to form thin liquid films around the individual fibers;

means for introducing gaseous fluid into the infeed chamber and through the first bag means into the evaporator chamber, the gaseous fluid inflating the first bag means and passing over said individual fibers to vaporize the liquid films thereon;

the vapor in the evaporator chamber flowing into the connecting chamber and through the second bag means into the condenser chamber, the vapor inflating the second bag means, and being condensed in the condenser chamber; and means for recovering the condensate from the condenser chamber.

7. Liquid purifying apparatus comprising, in combination:

means defining an infeed chamber, an evaporator chamber, a connecting chamber and a condenser chamber arranged in that order along a flow path;

first bag means interposed across the flow path between the infeed chamber and the evaporator chamber, the first bag means including a first inflatable bag disposed substantially entirely in the evaporator chamber;

second bag means interposed across the flow path between the connecting chamber and the condenser chamber, the second bag means including a second inflatable bag disposed substantially entirely in the condenser chamber;

each of the bag means comprising a flexible layer having a multiplicity of fibers of a material which is highly absorbent with respect to the liquid to be purified;

means for introducing liquid fluid to be purified into said infeed chamber, the liquid fluid flowing into the evaporator chamber to the interior of the first bag and spreading over substantially all of the fibers in the first bag to form thin liquid films around the individual fibers;

means for introducing gaseous fluid into the infeed chamber and through the first bag into the evaporator chamber, the gaseous fluid inflating the first bag and passing over said individual fibers to vaporize the liquid films thereon;

means for maintaining at least one of the introduced fluids at an elevated temperature within the range of from about 70° C. to about 80° C.;

the vapor in the evaporator chamber flowing into the connecting chamber and through the second bag into the condenser chamber, the vapor inflating the second bag and being condensed in the condenser chamber; and means for recovering the condensate from the condenser chamber.

8. Liquid purifying apparatus comprising, in combination:

means defining an infeed chamber, an evaporator chamber, a connecting chamber and a condenser chamber arranged in that order along a flow path, the condenser chamber having outlet means for discharging purified liquid and a multiplicity of closely spaced perforations separate from the outlet means;

first bag means interposed across the flow path between the infeed chamber and the evaporator chamber, the first bag means including a first inflatable bag disposed substantially entirely in the evaporator chamber;

second bag means interposed across the flow path between the connecting chamber and the condenser chamber, the second bag means including a second inflatable bag disposed substantially entirely in the condenser chamber;

each of the bag means comprising a flexible layer of fibrous material including a plurality of plies of a material which is highly absorbent with respect to the liquid fluid to be purified;

means for introducing liquid fluid to be purified into the infeed chamber, the liquid fluid flowing into the evaporator chamber to the interior of the first bag and spreading over substantially all of the fibers in the first bag to form thin liquid films around the individual fibers;

means for introducing gaseous fluid into the infeed chamber and through the first bag into the evaporator chamber, the gaseous fluid inflating the first bag means and passing over said individual fibers to vaporize the liquid films thereon;

the vapor in the evaporator chamber flowing into the connecting chamber and through the second bag into the condenser chamber to inflate the second bag, a substantial portion of the vapor being condensed in the condenser chamber and the remaining portion being discharged through said perforations;

means for supplying previously purified liquid to the fibers of the second bag, the supplied liquid being evaporated as the vapor passes through the second bag to reduce the temperature within the condenser chamber; and means for recovering the condensate from the outlet means of the condenser chamber.

9. Liquid purifying apparatus comprising, in combination:

means defining an infeed chamber, an evaporator chamber, a connecting chamber and a condenser chamber arranged in that order along a flow path;

first bag means interposed across the flow path between the infeed chamber and the evaporator chamber, the first bag means including a first inflatable bag disposed substantially entirely in the evaporator chamber;

second bag means interposed across the flow path bewteen the connecting chamber and the condenser chamber, the second bag means including a second inflatable bag disposed substantially entirely in the condenser chamber;

each of the bag means comprising a flexible layer having a multiplicity of fibers of a material which is highly absorbent with respect to the liquid to be purified;

means for introducing liquid fluid to be purified into said infeed chamber, the liquid flowing into the evaporator chamber to submerge a portion of the first bag and thoroughly wet the same, said liquid fluid spreading over substantially all of the fibers in the first bag means to form thin liquid films around the individual fibers;

means for introducing gaseous fluid into the infeed chamber and through the first bag into the evaporator chamber, the gaseous fluid inflating the first bag means and passing over said individual fibers to vaporize the liquid films thereon;

means for maintaining at least one of the introduced fluids at an elevated temperature within the range of from about 70° C. to about 80° C.;

the vapor in the evaporator chamber flowing into the connecting chamber and through the second bag into the condenser chamber, the vapor inflating the second bag and being condensed in the condenser chamber;

means for supplying previously purified liquid to the fibers of the second bag, the supplied liquid being evaporated as the vapor passes through the second bag to reduce the temperature within the condenser chamber; and means for recovering the condensate from the condenser chamber.

10. Liquid purifying apparatus comprising, in combination:

means defining an infeed chamber, an evaporator chamber, a connecting chamber and a condenser chamber arranged in that order along a flow path, the condenser chamber having outlet means for discharging purified liquid and a multiplicity of closely spaced perforations separate from the outlet means;

first bag means interposed across the flow path between the infeed chamber and the evaporator chamber, the first bag means including a first inflatable bag disposed substantially entirely in the evaporator chamber and means for maintaining the first inflatable bag in spaced relationship with the interior wall of the evaporator chamber;

second bag means interposed across the flow path between the connecting chamber and the condenser chamber, the second bag means including a second inflatable bag disposed substantially entirely in the condenser chamber and means for maintaining the second inflatable bag in spaced relationship with the interior wall of the condenser chamber;

each of the bag means comprising a flexible layer of fibrous material including a plurality of plies having a multiplicity of fibers of a material which is highly absorbent with respect to the liquid fluid to be purified;

means for introducing liquid fluid to be purified into the infeed chamber, the liquid fluid flowing into the evaporator chamber to the interior of the first bag, a portion of the first bag being immersed in the liquid fluid in the evaporator chamber and the liquid fluid spreading over the fibers in the first bag to form thin liquid films around the individual fibers;

means for introducing gaseous fluid into the infeed chamber and through the first bag into the evaporator chamber, the gaseous fluid inflating the first bag means and passing over said individual fibers to vaporize the liquid films thereon;

means for maintaining at least one of the introduced fluids at an elevated temperature within the range of from about 70° C. to about 80° C.;

the vapor in the evaporator chamber flowing into the connecting chamber and through the second bag into the condenser chamber to inflate the second bag, a substantial portion of the vapor being condensed in the condenser chamber and the remaining portion being discharged through said perforations;

means for supplying previously purified liquid to the fibers of the second bag, the supplied liquid being evaporated as the vapor passes through the second bag to reduce the temperature within the condenser chamber; and means for recovering the condensate from the outlet means of the condenser chamber.

11. Apparatus as defined in claim 10, in which the outlet means comprises a layer of fibrous material for receiving the purified liquid from the condenser chamber.

12. Apparatus as defined in claim 1, in which the condenser chamber includes a multiplicity of closely spaced perforations in only the upper portion thereof to permit the discharge of vapor from said condenser chamber.

* * * * *